United States Patent [19]

Woodruff

[11] Patent Number: 4,919,993

[45] Date of Patent: Apr. 24, 1990

[54] FLEXURES AND METHOD FOR CREATING FLEXURES IN A WAFER

[75] Inventor: James R. Woodruff, Redmond, Wash.

[73] Assignee: Sundstrand Data Control, Inc., Redmond, Wash.

[21] Appl. No.: 317,159

[22] Filed: Feb. 27, 1989

[51] Int. Cl.$^5$ .................... H01L 21/306; B44C 1/22
[52] U.S. Cl. ................................. 428/134; 73/514;
156/644; 156/647; 156/651; 156/653; 156/657;
156/659.1; 156/662; 428/137; 428/156
[58] Field of Search ............... 156/644, 647, 651, 653,
156/657, 659.1, 661.1, 662; 29/25.35, 621.1;
73/514, 517 R, 718, 724, 754, 777; 428/131,
134, 137, 156, 167

[56] References Cited

U.S. PATENT DOCUMENTS 4,812,199 3/1989 Sickafus .................... 156/647 X

Primary Examiner—William A. Powell
Attorney, Agent, or Firm—Michael S. Yatsko; Trevor B. Joike

[57] ABSTRACT

Flexures, and a method for creating flexures, for use in micromechanical sensors such as accelerometers in which a first member is pivotally connected to a second member. In one aspect, the invention provides first and second flexures connecting the first and second members, the flexures permitting rotation about a common hinge axis. The flexures have a crossed configuration that provides increased stability. Each flexure is made by etching grooves in the opposite wafer surface, the positions and depths of the grooves being selected so as to form a flexure therebetween.

11 Claims, 4 Drawing Sheets

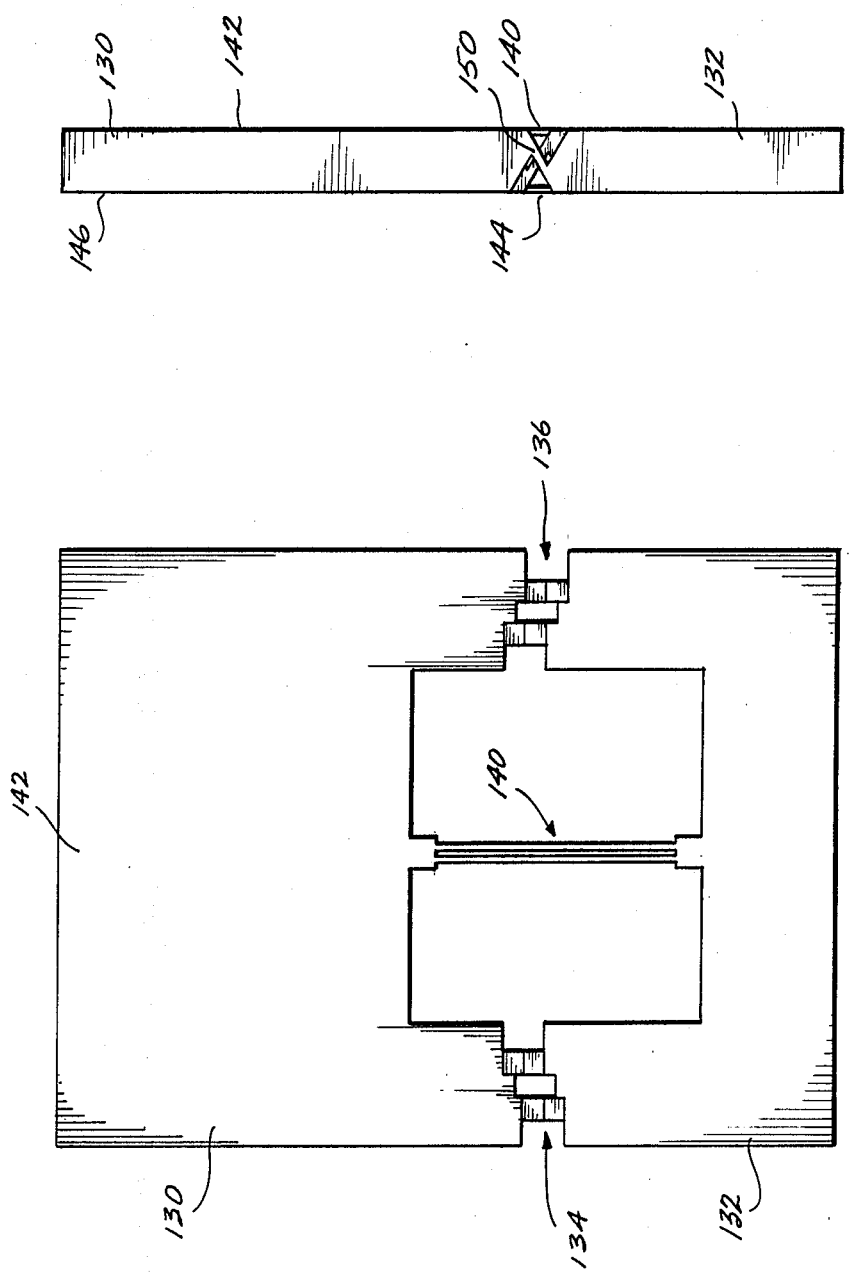

FLEXURES AND METHOD FOR CREATING FLEXURES IN A WAFER

FIELD OF THE INVENTION

The present invention relates to flexures created in silicon wafers and the like, to produce structures that can be used in micromachined sensors such as accelerometers.

BACKGROUND OF THE INVENTION

In one well known type of accelerometer design, a proof mass is connected to a support by one or more flexures that permit the proof mass to rotate in response to an acceleration along a predetermined sensitive axis. In a conventional accelerometer, flexures may be fabricated by mechanically thinning a portion of a blank from which the proof mass is cut. However, in a micromechanical accelerometer of the type that is formed from a single crystal of silicon, the flexures must generally be created by etching techniques. Because of the relative inflexibility of etching processes, as compared to mechanical formation, the options for creating flexures in a silicon micromechanical device are somewhat limited. One known technique is to create an epitaxial layer on one surface of a silicon wafer, and then etch an opening in the opposite wafer surface, using the epitaxial layer as an etch stop. Although this a highly reproducible technique, it suffers from the fact that the effective hinge axis of the flexure is located in the plane of one surface of the wafer, rather than at a point midway between the wafer surfaces. As a result, the effective sensitive axis of the accelerometer is not parallel to the wafer surfaces, and alignment of the instrument with an external housing is thereby made more difficult.

SUMMARY OF THE INVENTION

The present invention provides novel flexures, and a novel method for creating flexures, particularly adapted for use in silicon micromechanical devices. In an accelerometer, the technique of the present invention permits the creation of a flexure system having an effective hinge axis midway between the surfaces of the silicon wafer.

In one aspect, the present invention provides an improvement for a sensor fabricated from a wafer having upper and lower surfaces, the sensor being of the type comprising a first member pivotally connected to a second member. The improvement comprises first and second flexures connecting the first member to the second member, the flexures permitting rotation of the second member with respect to the first member about a common hinge axis. The first flexure is connected to the first member at a position closer to the upper than to the lower wafer surface, and is connected to the second member at a position closer to the lower than to the upper wafer surface. The second flexure is connected to the first member at a position closer to the lower than to the upper wafer surface, and is connected to the second member at a position closer to the upper than to the lower wafer surface. The result is a highly stable "crossed flexure" arrangement.

In a second aspect, the present invention provides a method for processing a wafer having upper and lower surfaces, so as to produce a first wafer portion flexurally connected to a second wafer portion. The method comprises etching first and second grooves in the upper and lower wafer surfaces, respectively, the first and second grooves having respective first and second longitudinal axes. The step of etching the first groove comprises removing wafer material on one side of a first plane that is parallel to the first longitudinal axis, and that intersects the upper surface of the wafer at an acute angle. The step of etching the second groove comprises removing wafer material on one side of a second plane that is parallel to the second longitudinal axis, and that intersects the lower surface of the wafer at an acute angle. The positions and depths of the first and second grooves are selected such that a section of the wafer between the first and second planes forms a flexure connecting the first and second wafer portions to one another. This method can be extended to create crossed flexures of the type described above.

BRIEF DESCRIPTION OF THE DRAWINGS

FIGS. 9 and 10 illustrate an accelerometer formed using two crossed flexure pairs.

DETAILED DESCRIPTION OF THE INVENTION

Figure 1:
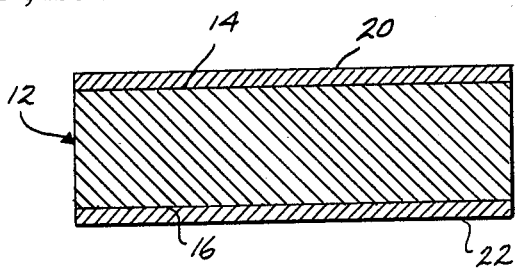
FIGS. 1-4 illustrate the fabrication of a single flexure in accordance with the present invention.

The general technique of the present invention can be described with reference to FIGS. 1-4. FIG. 1 presents a side or cross-sectional view of a silicon wafer 12. Wafer 12 includes upper surface 14 and lower surface 16. Upper surface 14 is covered with a masking (e.g., silicon dioxide) layer 20, and lower surface 16 is similarly provided with a masking layer 22. It is assumed that upper surface 14 and lower surface 16 have 100 orientations, i.e., that these surfaces are parallel to the 100 crystal plane.

Figure 2:
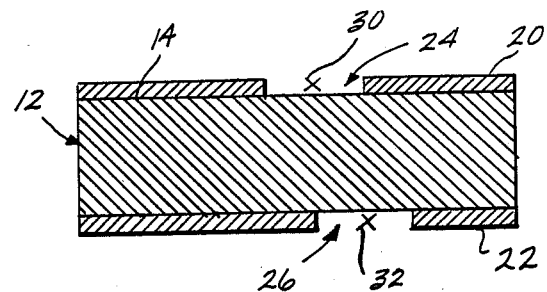
Figure 3:
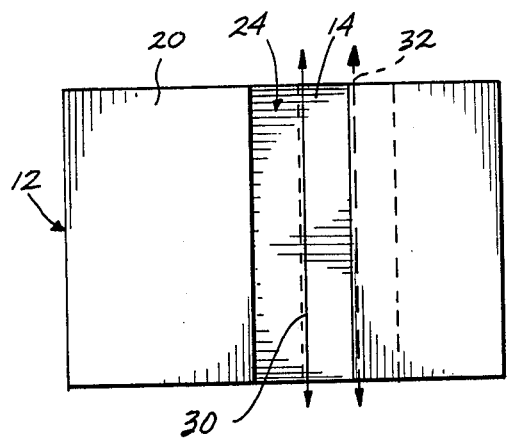

In a preferred embodiment, the method of the present invention proceeds by creating rectangular openings 24 and 26 in masking layers 20 and 22, respectively, as shown in FIGS. 2 and 3. Opening 24 is aligned with a central longitudinal axis 30, and opening 26 is aligned with a central longitudinal axis 32. The longitudinal axes are parallel to one another and to wafer surfaces 14 and 16. FIG. 3 shows axis 32 in phantom, but does not show opening 26, to simplify the illustration. Axis 32 is offset from axis 30 in a lateral direction, perpendicular to axes 30 and 32 and parallel to the wafer surfaces 14 and 16. Axes 30 and 32 are preferably aligned parallel to the 110 crystal plane, which plane is typically defined by a flat portion or notch on the silicon wafer.

Figure 4:
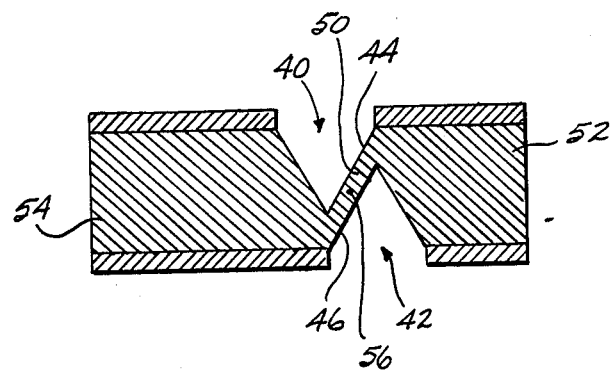

The next step in the illustrated embodiment is to etch the upper and lower surfaces of wafer 12 using an anisotropic etchant. As a result, as shown in FIG. 4, V-shaped grooves 40 and 42 are formed in the upper and lower surfaces of wafer 12. The outer groove edges, i.e., the upper edges of groove 40 and the lower edges of groove 42, are aligned with openings 24 and 26 in masking layers 20 and 22, respectively. Each groove consists of four sidewalls, each sidewall extending along a 111 crystal plane that forms an angle of about 55° with the wafer surface in which the groove is etched. Thus each of grooves 40 and 42 has a V-shaped cross section in a plane normal to its longitudinal axis. The original positions and sizes of openings 24 and 26 are selected such that when grooves 40 and 42 have been etched, sidewall 44 of groove 40 and sidewall 46 of groove 42 cooperate to form flexure 50 between the grooves. Flexure 50 preferably has a uniform cross section along the direction parallel to longitudinal axes 30 and 32. The flexure connects first portion 52 and second portion 54 of wafer 12, such that portion 52 can rotate, relative to portion 54, about hinge axis 56 that is parallel to, and spaced midway between, the longitudinal axes 30 and 32 of respective openings 24 and 26 (FIG. 2). Hinge axis 56 is thus positioned midway between wafer surfaces 14 and 16. As a result, when the technique shown in FIGS. 1-4 is used to form a proof mass and associated flexure for an accelerometer, the sensitive axis of the accelerometer will be perpendicular to surfaces 14 and 16.

Figure 5:
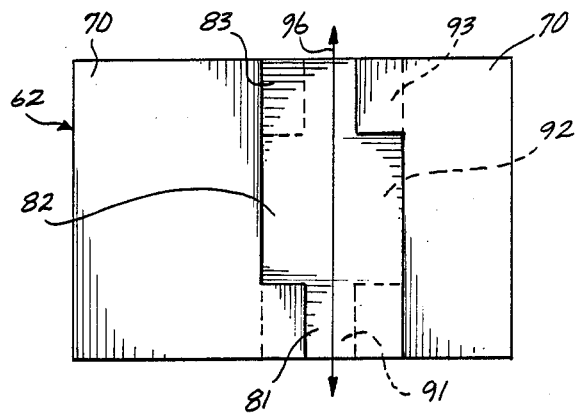
FIGS. 5-8 illustrate the formation of a crossed flexure pair, in accordance with the present invention.
Figure 6:
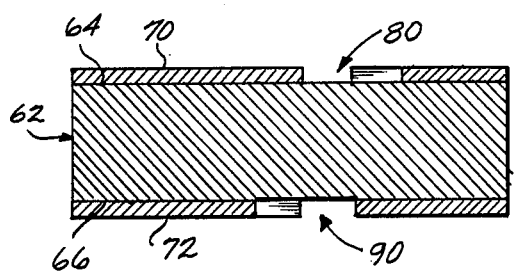

The production of a crossed flexure pair according to the present invention is illustrated in FIGS. 5-8. Referring initially to FIGS. 5 and 6, wafer 62 includes upper surface 64 and lower surface 66 that in turn include masking layers 70 and 72, respectively. Masking layer 70 includes composite opening 80, shown in bold outline in FIG. 5, that consists of side opening 81, central opening 82 and side opening 83. Similarly, lower masking layer 72 includes composite opening 90, shown in phantom outline in FIG. 5, that includes side opening 91, central opening 92 and side opening 93. In the plane of surfaces 64 and 66, central openings 82 and 92 are coextensive with one another, and are symmetrical with respect to axis 96 that will become the hinge axis of the flexure. Side opening 81 has its rightmost edge aligned with the rightmost edge of central opening 82, but has a left edge that is displaced inwardly in comparison to the left edge of opening 82, towards axis 96. As a result, side opening 81 is somewhat offset to the right of axis 96. Side opening 91 in lower masking layer 72 is offset a similar distance to the left of axis 96, such that side openings 81 and 91 have an alignment, relative to one another, similar to the alignment of openings 24 and 26 shown in FIG. 2. Side openings 83 and 93 have a similar relative alignment, except that in the case of this pair of openings, side opening 83 in upper masking layer 70 is positioned to the left with respect to side opening 93 in lower masking layer 72.

Figure 7:
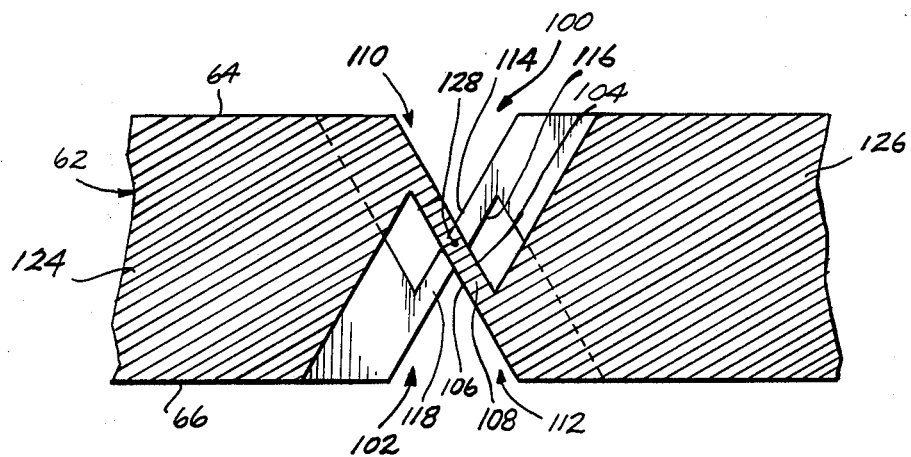
Figure 8:
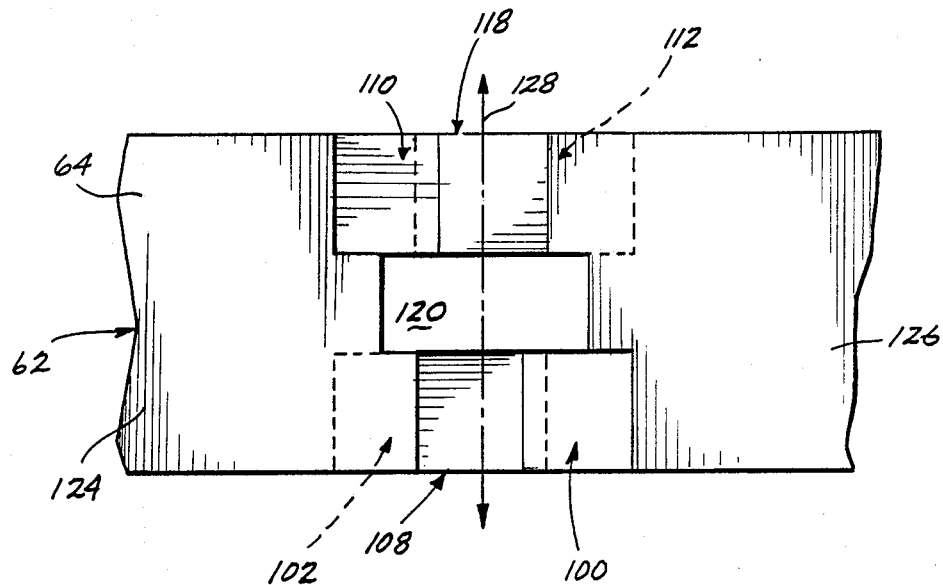

The result of etching the structure shown in FIGS. 5 and 6 with an anisotropic etching, similar to that used above in connection with FIGS. 1-4, and of then removing the masking layers, is shown in FIGS. 7 and 8. Etching through side openings 81 and 91 has produced V-shaped grooves 100 and 102 having respective sidewalls 104 and 106 between which flexure 108 has been formed. Etching through side openings 83 and 93 has produced V-shaped grooves 110 and 112 having respective sidewalls 114 and 116 between which flexure 118 has been formed. Etching through central openings 82 and 92 has proceeded entirely through wafer 62, to create opening 120 between the flexures.

As with the embodiment of FIGS. 1-4, flexures 108 and 118 permit relative rotation of first and second portions 124 and 126 of wafer 62 about a hinge axis 128 that passes through the midpoint of the flexures, and that is positioned halfway between wafer surfaces 64 and 66. In addition, the fact that flexures 108 and 118 cross one another, as viewed in FIG. 7, produces a highly stable structure that eliminates flexure S-bending and sag, while maintaining the angular compliance of a single flexural pivot.

FIGS. 9 and 10 illustrate an accelerometer formed using flexures formed in accordance with the present invention. The accelerometer includes proof mass 130 that is suspended from support 132 by crossed flexure pairs 134 and 136. A first dual vibrating beam force transducer 140 is formed at upper surface 142 of the wafer, while a second identical force transducer 144 is formed at lower surface 146 of the wafer. As a result, the effective hinge axis 150 of the proof mass lies midway between the upper and lower surfaces 142 and 146, as well as between force transducers 140 and 144. The flexures may be etched from a single crystal of silicon, in a manner similar to that described above in connection with FIGS. 1-8.

While the preferred embodiments of the invention have been illustrated and described, variations will be apparent to those skilled in the art. Accordingly, the scope of the invention is to be determined by reference to the following claims.

The embodiments of the invention in which an exclusive property or privilege is claimed are defined as follows:

1. In a sensor fabricated from a wafer having upper and lower surfaces, the sensor comprising a first member pivotally connected to a second member, the improvement comprising first and second flexures connecting the first member to the second member, the flexures permitting rotation of the second member with respect to the first member about a common hinge axis, the first flexure being connected to the first member at a position closer to the upper than to the lower surface of the wafer and being connected to the second member at a position closer to the lower than to the upper surface of the wafer, the second flexure being connected to the first member at a position closer to the lower than to the upper surface of the wafer and being connected to the second member at a position closer to the upper than to the lower surface of the wafer.

2. The improvement of claim 1, wherein the first and second flexures are positioned on opposite sides of an opening extending through the wafer between the upper and lower surfaces.

3. The improvement of claim 2, wherein each flexure is substantially planar and is formed from wafer material between a pair of grooves etched in the upper and lower surfaces, respectively, of the wafer.

4. The improvement of claim 3, wherein the wafer comprises silicon, and wherein the upper and lower surfaces are parallel to the 100 crystal plane.

5. The improvement of claim 4, wherein the common hinge axis is parallel to the 110 crystal plane, wherein each groove has a V-shaped cross section in a plane normal to the hinge axis.

6. A method of processing a wafer having upper and lower surfaces so as to produce a first wafer portion flexurally connected to a second wafer portion, the method comprising:

etching a first groove in the upper surface of the wafer, the first groove having a first longitudinal axis, the step of etching the first groove comprising removing wafer material on one side of a first plane that is parallel to the first longitudinal axis and that intersects the upper surface at an acute angle;

etching a second groove in the lower surface of the wafer, the second groove having a second longitudinal axis, the step of etching the second groove comprising removing wafer material on one side of a second plane that is parallel to the second longitudinal axis and that intersects the lower surface at an acute angle, the positions and depths of the first and second grooves being selected such that a section of the wafer between the first and second plane forms a first flexure connecting the first and second wafer portions to one another, the first flexure being connected to the first portion at a position closer to the upper than to the lower surface of the wafer and being connected to the second portion at a position closer to the lower than to the upper surface of the wafer;

etching a third groove in the first surface of the wafer, the third groove having a third longitudinal axis, the step of etching the third groove comprising removing wafer material on one side of a third plane that is parallel to the third longitudinal axis and that intersects the first surface at an acute angle;

etching a fourth groove in the second surface of the wafer, the fourth groove having a fourth longitudinal axis, the step of etching the fourth groove comprising removing wafer material on one side of a fourth plane that is parallel to the fourth longitudinal axis and that intersects the second surface at an acute angle, the positions and depths of the third and fourth grooves being selected such that a section of the wafer between the third and fourth planes forms a second flexure connecting the first and second wafer portions to one another, the second flexure being connected to the first portion at a position closer to the lower than to the upper surface of the wafer and being connected to the second portion at a position closer to the upper than to the lower surface of the wafer; and the first and second flexures being oriented so as to permit rotation of the first wafer portion with respect to the second wafer portion about a common hinge axis.

7. The method of claim 6, comprising the further step of etching an opening extending between the upper and lower surfaces between the flexures.

8. The method of claim 6, wherein the wafer comprises silicon, and wherein the upper and lower surfaces are parallel to the 100 crystal plane.

9. The method of claim 8, wherein the first and second longitudinal axes are parallel to the 110 crystal plane, and wherein each groove has a V-shaped cross section in a plane normal to the hinge axis.

10. The method of claim 6, wherein the wafer comprises silicon, and wherein the upper and lower surfaces are parallel to the 100 crystal plane.

11. The method of claim 10, wherein the common hinge axis is parallel to the 110 crystal plane, and wherein each groove has a V-shaped cross section in a plane normal to the hinge axis.

* * * * *